United States Patent [19]

Dugger

[11] Patent Number: 4,544,188
[45] Date of Patent: Oct. 1, 1985

[54] PIPE JOINT GLANDS

[75] Inventor: Ben A. Dugger, Phenix City, Ala.

[73] Assignee: Columbus Foundries, Inc., Columbus, Ga.

[21] Appl. No.: 482,624

[22] Filed: Apr. 6, 1983

[51] Int. Cl.[4] .............................. F16L 23/00
[52] U.S. Cl. ................... 285/337; 285/374; 285/404; 285/413
[58] Field of Search ............... 285/337, 413, 404, 374

[56] References Cited

U.S. PATENT DOCUMENTS

| | | |
|---|---|---|
| 1,078,009 | 11/1913 | Taylor . |
| 1,345,334 | 6/1920 | Gtafford .................. 285/337 X |
| 1,365,530 | 1/1921 | Moore . |
| 1,434,952 | 11/1922 | Johnson . |
| 1,951,034 | 3/1934 | Norton .................... 285/119 |
| 1,979,141 | 10/1934 | Clark et al. .............. 285/135 |
| 2,328,168 | 8/1943 | Risley ..................... 285/337 X |
| 2,969,995 | 1/1961 | Boughton ................ 285/337 X |
| 3,065,000 | 11/1962 | Stanton ................... 285/177 |
| 3,333,872 | 8/1967 | Crawford, Jr. et al. .. 285/374 |
| 3,415,547 | 12/1968 | Yano ....................... 285/337 |
| 4,092,036 | 5/1978 | Gato et al. ............... 285/374 X |
| 4,295,668 | 10/1981 | Louthan et al. .......... 285/337 X |
| 4,417,754 | 11/1983 | Yamaji et al. ............ 285/374 X |

OTHER PUBLICATIONS

FIG. 11-1 and Notes on p. 7 entitled "Rubber Gasket Joints".
Page numbered "MJ-2" having at left top margin: U.S. Pipe: Steps in Assembly of Mechanical Joint Pipe.
Page numbered "MJ-3" having at left top margin: U.S. Pipe: Standard Mechanical Joint for Ductile Iron Pipe.

Primary Examiner—Richard J. Scanlan, Jr.
Attorney, Agent, or Firm—Kilpatrick & Cody

[57] ABSTRACT

A ductile iron molded pipe joint gland used to create an effective and lasting seal between interfitting pipe sections allows considerable deflection of the joint in any direction from the axis of the pipeline without loss of seal integrity. The interfitting pipe sections are mechanically joined securely by the gland and compressible seal in a follower gland embodiment and also by angled set screws in a retainer gland embodiment. The pipe joint gland utilizes a minimum of material for reduced weight and savings of energy in its manufacture and transportation without sacrifice of strength. The construction and shallow angle of the sealing gasket engaging face of the gland prevents gasket creep under high pressure.

17 Claims, 10 Drawing Figures 4,544,188

PIPE JOINT GLANDS

BACKGROUND OF THE INVENTION

Follower glands are employed at joints between bell and spigot type components as typically exemplified in expired U.S. Pat. Nos. 1,365,530 to Moore, and 1,951,034 to Norton, and retainer glands having means to grip the pipe around which it is fitted are used rather than follower glands in applications where the pipe must be restrained against surges and thrusts such as may occur where the run of pipe turns a corner. Such a retainer gland is disclosed in U.S. Pat. No. 3,333,872 to Crawford et al. In the prior art, pipe joint glands of this type have assumed a variety of forms in order to increase their effectiveness in sealing a pipe joint and allow a certain degree of deflection of the pipeline from a true axis at the joints without causing leakage. Such glands are typically manufactured of cast iron and achieve strength primarily by virtue of their mass.

SUMMARY OF THE INVENTION

The present invention comprises a follower gland and a retainer gland of improved design to achieve greater strength than conventionally designed glands of comparable weight while providing a shape which may be easily and successfully cast of ductile iron or other appropriate materials.

Gland embodiments of the present invention include a top radial web in a plane normal to the axis of the pipeline on which the gland is used. A plurality of bolt holes are circumferentially and equidistantly spaced around the periphery of the web, which holes are circular at the top faces of the circular bosses and are flared toward their opposite ends, gradually blending to oval forms at their exits. Such transition from circular to oval results in greater compaction of sand utilized in a sand-cast mold and thereby reduces metal penetration of the mold and mold wall movement. Castings are consequently more accurate and dimensionally consistent and require less grinding during finishing.

The interior surface of the radial web is a web wall which is frusto-conical in shape. The axis of this frustum is normal to the pipeline axis, so that the web wall is disposed at a shallow angle to contact a conventional sealing gasket utilized in bell and spigot pipe joints. Accordingly, gland design of the present invention provides adequate support to the gasket contacting face to allow a face with relatively small surface area which requires relatively little finishing.

Gland strength is enhanced by advantageous and strategic positioning of ribs. Short radial ribs join the bolt hole bosses to the gland axial wall and distribute forces applied by the tightened bolts. Arcuate upstanding ribs at the periphery of the gland, which span adjacent bolt bosses, resist deformation of the gland near the bolt bosses by absorbing radially outward forces caused by tightened bolts whose axes are radially outside of the face upon which the gland rests. These arcuate ribs act in a catenary fashion to transmit and distribute such forces to the span between adjacent bolt bosses, resulting in more uniform resistance to outward deformation of the gland about its circumference.

The retainer gland embodiments of the present invention also include upstanding peripheral ribs which are increased in height and provided with set screw bosses having threaded holes to receive set screws which grip the pipe to resist its movement out of the adjacent pipe bell as a result of pressure surges and thrusts or other forces.

Accordingly, it is an object of this invention to satisfy the need for better pipe joint glands with a minimum of expense and use of a minimum of raw materials and energy.

More particularly, an object of the present invention is to provide a follower gland and a retainer gland which are capable of providing an adequate seal at a bell and spigot pipe joint while allowing some deflection of the pipeline from its true axis.

A further object is to provide a follower gland and a retainer gland of lesser weight than the comparable prior art without sacrifice of rigidity and strength, with consequent savings in materials and energy in manufacture and expense in transportation.

An additional object of the present invention is to provide follower and retainer glands designed so that they may be easily molded while utilizing a structural configuration having much greater strength than conventional glands of comparable weight.

Other features and advantages of the invention will become apparent during the course of the following detailed description.

Figure 1:
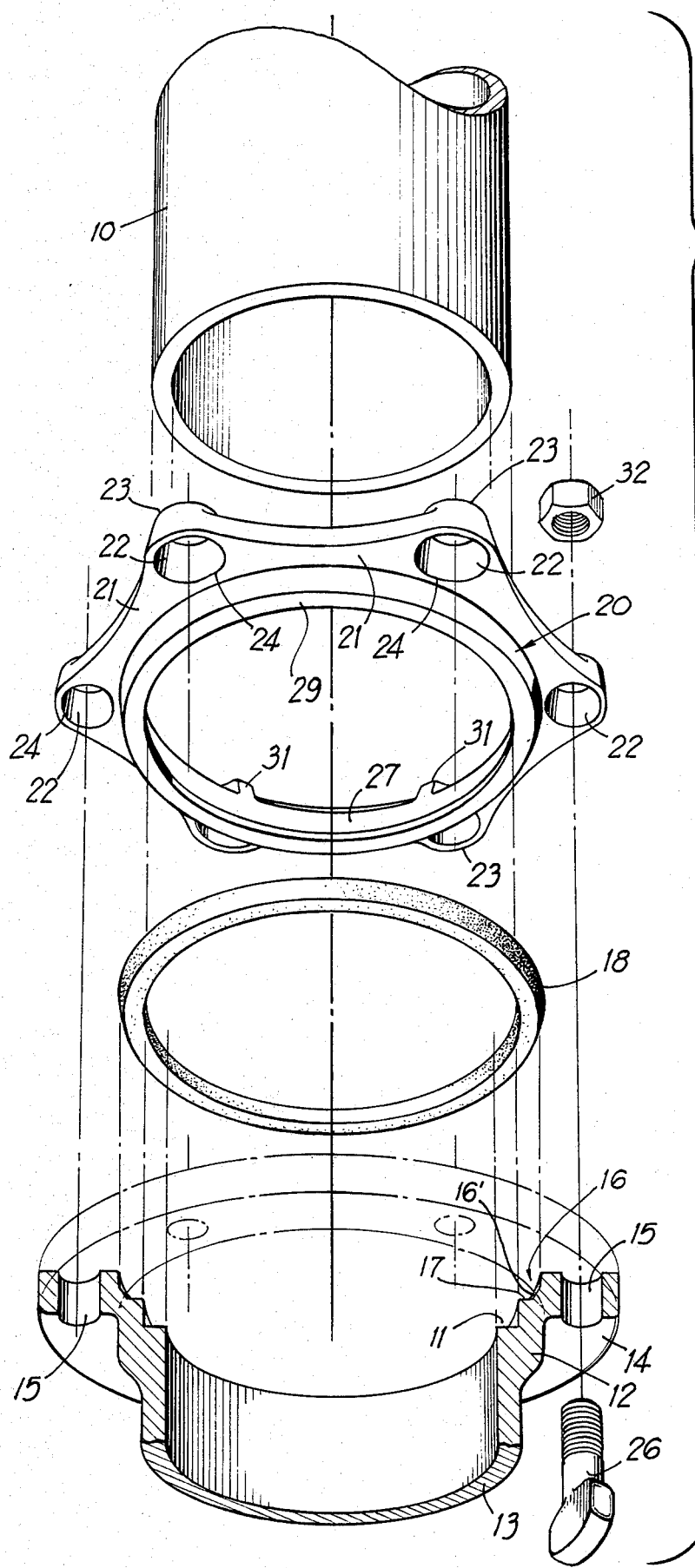
FIG. 1 is an exploded perspective view of pipe components, a seal and a follower gland utilized in forming a leak-proof joint.

As used in the following detailed description, the terms "top" and "bottom" and "upper" and "lower" are for reference only with respect to the drawing figures, and are not to be read in a limiting sense.

DETAILED DESCRIPTION OF THE DRAWINGS

Referring to the drawings in detail wherein like numerals designate like parts, a pipe spigot end 10 is engaged in a cylindrical recess 11 formed in the bell end 12 of a pipe section 13, the bell end carrying an integral annular flange 14 having a plurality of bolt holes 15 in circumferentially equidistantly spaced relationship. Typically, six bolt holes 15 are provided in nominally six inch diameter pipe, although this number varies for other pipe diameters.

Forwardly of the recess 11, the bell end 12 has a second annular recess 16 including a bottom surface 17 which is normal to the pipeline axis. The side wall of recess 16 has a slight draft or taper, as shown.

Figure 2:
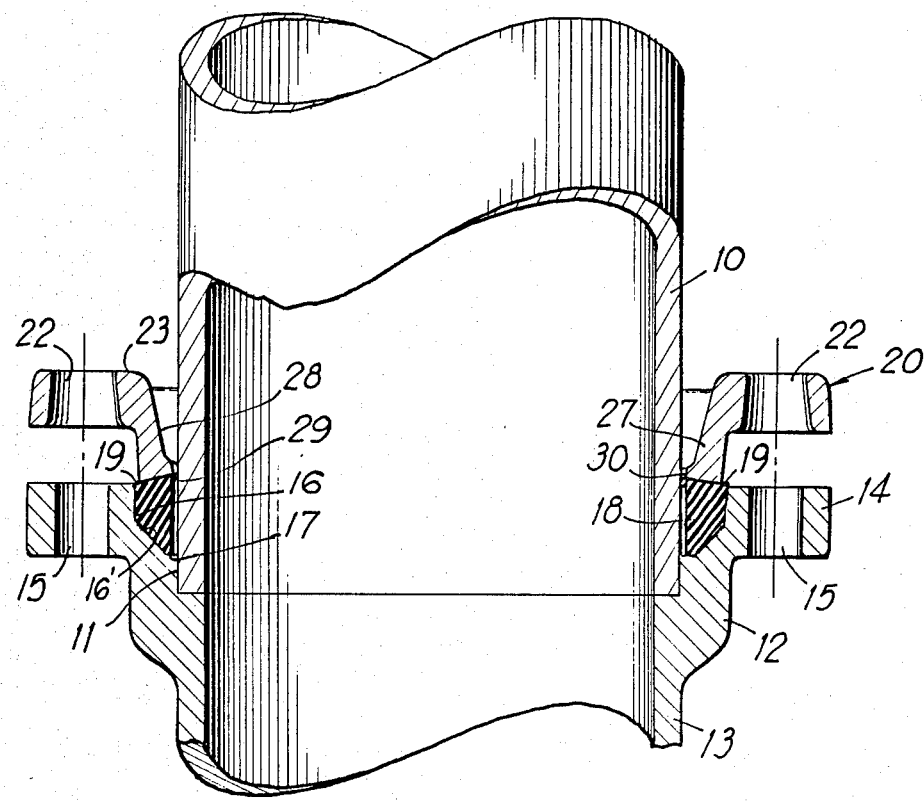
FIG. 2 is a central vertical section taken through a pipe joint utilizing the follower gland before the gland is finally in place.

A compressible sealing gasket 18 in ring form, formed of rubber-like material, is provided, and prior to compression, FIG. 2, this gasket is generally triangular in cross section, although its top face 19 is beveled at a shallow angle with respect to a diametrical plane through the pipeline, the top face 19 sloping downwardly toward the exterior margin of the gasket 18. The outer circumference of the gasket 18 may also match the draft of the inwardly sloped wall 16' (shown in FIGS. 2 and 3) of the recess 16 which receives the gasket. When in the uncompressed state, the top face 19 of the gasket is disposed well below the top of the recess 16.

A follower gland 20 in accordance with the main subject matter of this invention comprises a top web 21 which lies in a plane normal to the pipeline axis. Although the gland 20 may be molded of any appropriate material, including metals and plastic materials, the preferred embodiment is made of ductile iron to achieve the desired combination of strength and light weight. The follower gland has a plurality of circumferentially equidistantly spaced bolt holes 22 around its periphery corresponding in number to the openings 15 and being formed on a common circumference therewith for proper registration. The bolt holes 22 of the gland are circular at the top faces of circular bosses 23 provided at the top of the follower gland 20 and the bolt holes are flared toward their opposite ends and gradually blend to oval forms 24 at their exits through the bottom face of the web 21. The oval axes of the holes 22 extend circumferentially of the gland, as best shown in FIG. 4.

Figure 4:
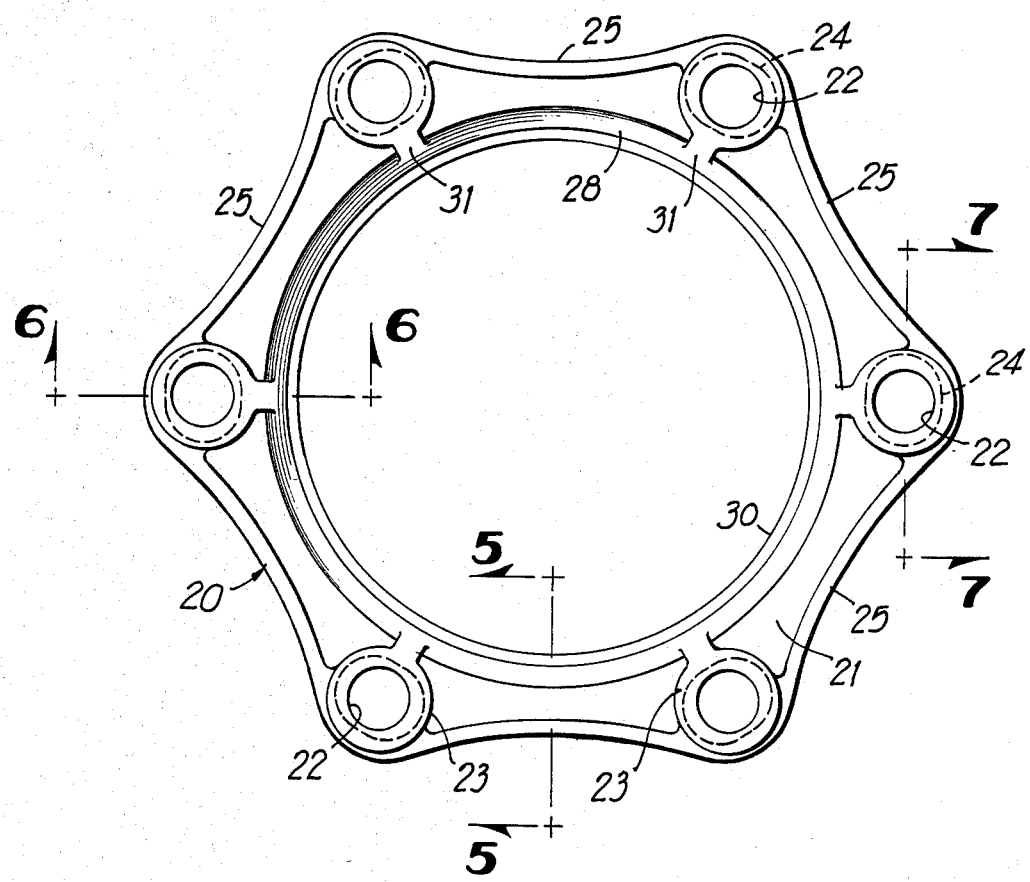
FIG. 4 is a top plan view of the follower gland.
Figure 5:
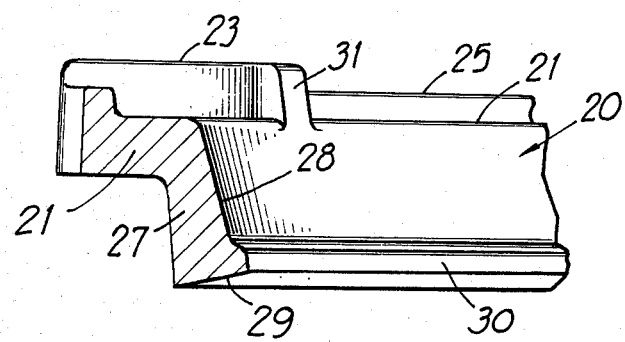
FIG. 5 is an enlarged fragmentary radial section taken on line 5—5 of FIG. 4.
Figure 6:
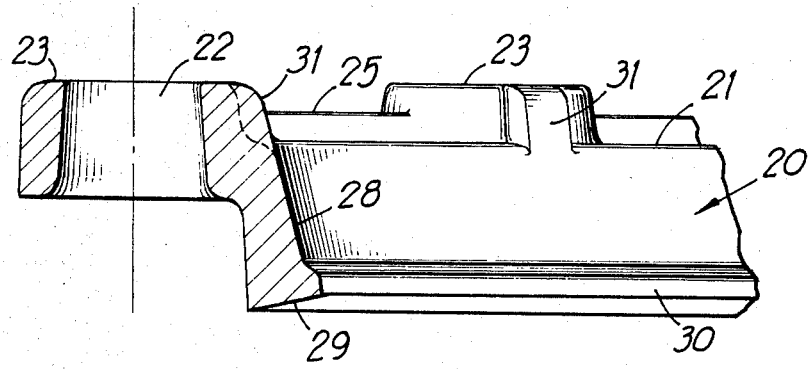
FIG. 6 is a similar section taken on line 6—6 of FIG. 4.
Figure 7:
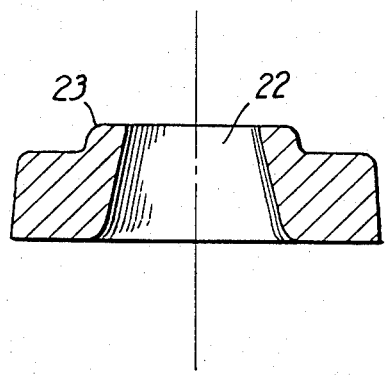
FIG. 7 is a fragmentary vertical section taken on line 7—7 of FIG. 4.
Figure 8:
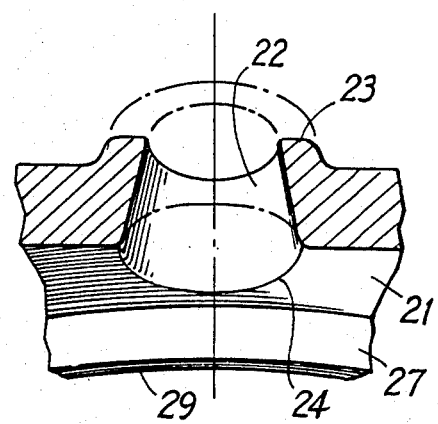
FIG. 8 is a fragmentary bottom perspective view of the follower gland, partly in section adjacent to one of the bolt holes of the gland.

The outer margin of the web 21 is defined by upstanding ribs 25 at the top of the gland and the opposite ends of these ribs blend smoothly into the bosses 23, as best shown in FIG. 4. The margin of the gland between the bosses 23, formed by ribs 25, is curved or scalloped between the bosses 23 for increased resistance to internal pressures and bending stresses caused by tightening of the bolts 26 which are received by gland openings 22 and bell openings 15.

At the interior of the radial web 21, the follower gland includes a concentric, generally axial web or wall 27 whose interior surface 28 is drafted to diverge from the periphery of pipe section 10 which it surrounds. The outer face of the wall 27 matches the compression face of the recess 16. The lower end face 29 of the wall 27 is disposed at a shallow angle to a diametrical plane across the pipe axis and is parallel to the top face 19 of gasket 18. The bottom face 29 is radially widened to extend inwardly in rather close fitting relationship to the periphery of pipe section 10 which it surrounds. This formation of the end face 29 produces an interior annular rim 30 on the follower gland 20 at its bottom or end away from the bosses 23.

The wall 27 at its top is joined by short radial ribs 31 to the bosses 23 for still further rigidity in the follower gland. The heads of the bolts 26 or nuts 32 bear directly and fully on the top surfaces of the bosses 23 which are coaxial with the bolt holes 22 and 15. The pressure caused by tightening bolts 26 is thus transferred directly and squarely to flange 28 and to gasket 19. At these points, the ribs 31 strongly resist bending, as do the ribs 25, which are disposed in generally right angular planes. Thus, at the points of bolt and nut contact, the follower gland 20 possesses its maximum resistance to bending or deflection. It is important that bosses 23 have sufficient height to insure that nuts 32 may be threaded onto bolts 26 and adequately tightened before unthreaded portions of bolts 26, which typically are not fully threaded, are reached by nuts 32.

Figure 3:
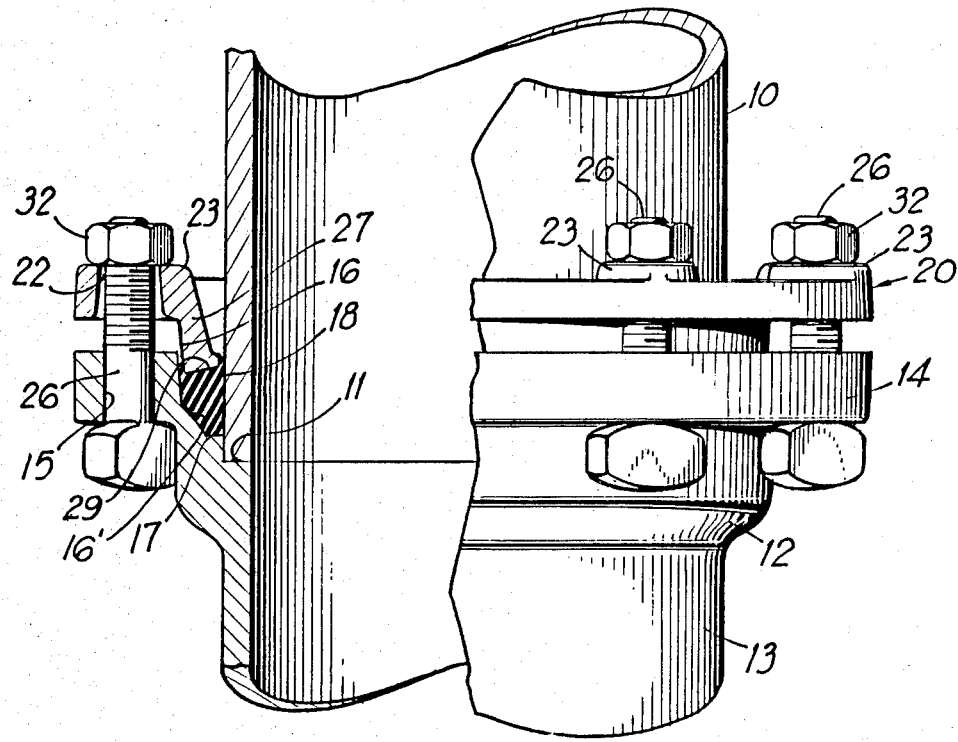
FIG. 3 is a similar section through the pipe joint with the follower gland fully in place.

As best shown in FIG. 3, the generally axial wall 27 projects deeply into the recess 16 when the nuts 32 are tightened onto bolts 26. The wide gasket contact face 29 disposed at a shallow angle to a plane perpendicular to the pipeline axis exerts pressure on the gasket 18 across almost entirely the full radial width of the gasket. Since the contact face 29 converges radially outwardly with the annular bottom surface 17 of recess 16, the gasket 18 is squeezed inwardly toward the periphery of pipe section 10 as well as downwardly into firm contact with surface 17. The gasket cannot creep or extrude between the follower gland and pipe section 10 due to the relatively close fitting relationship of the annular rim 30 with the pipe section 10. The construction is such that a very secure seal can be effected at the pipe joint, and the pressure of the elastic seal against the periphery of pipe section 10 securely locks the two pipe sections together while permitting limited deviation or deflection of pipe sections from the true axial relationship without allowing leakage. All of these features are achieved by the use of a lighter than normal gland, as previously explained.

Figure 9:
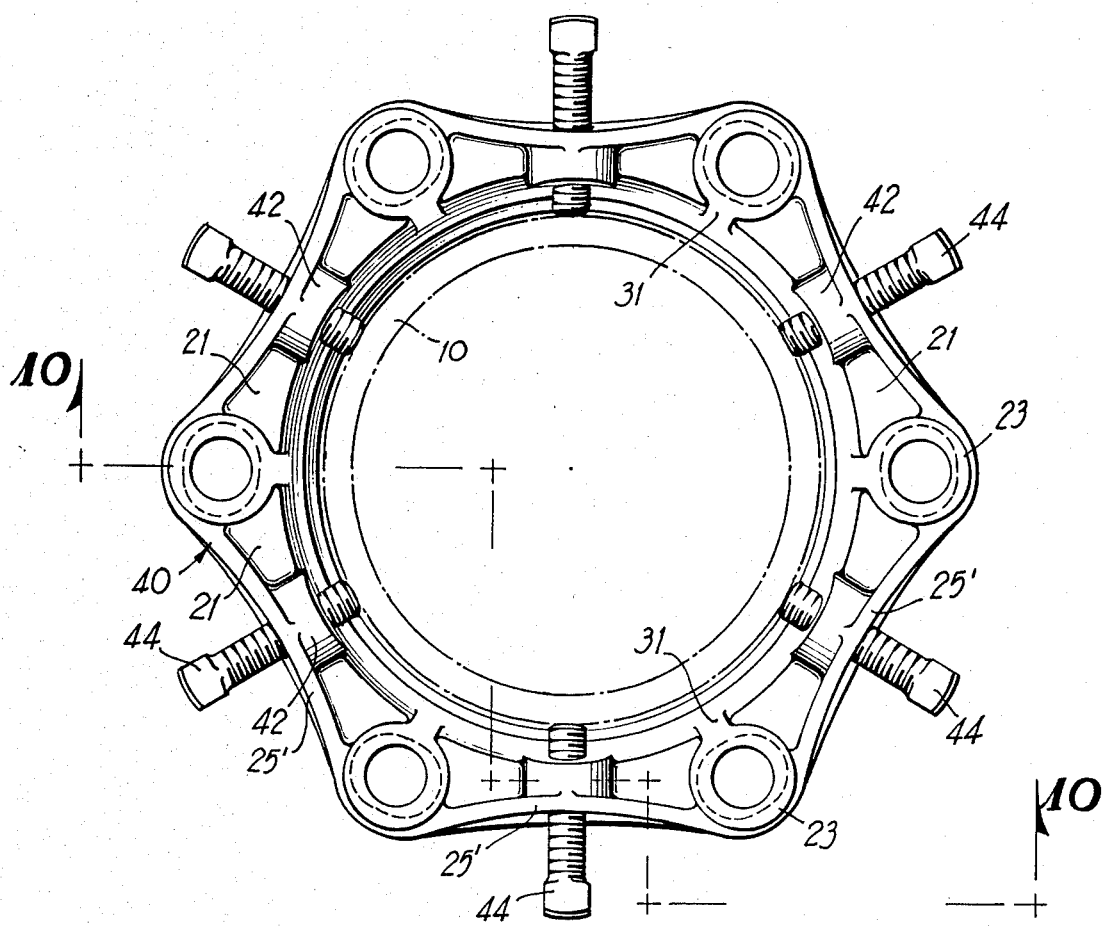
FIG. 9 is a top plan view of the retainer gland of the present invention shown positioned on a section of pipe.
Figure 10:
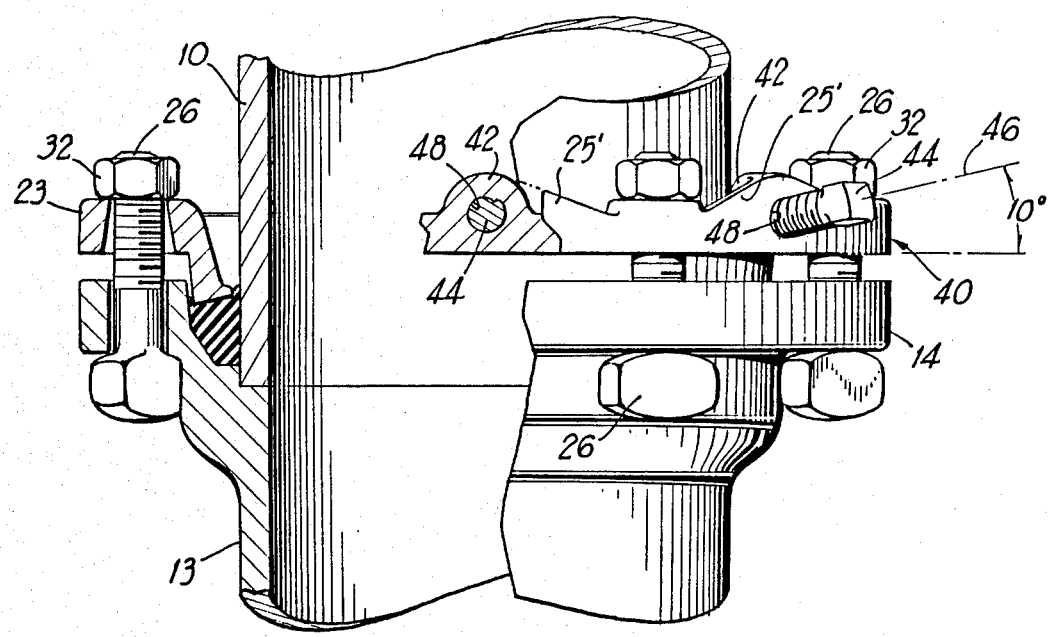
FIG. 10 is a central vertical section taken on line 10—10 of FIG. 9.

A second embodiment of the present invention is illustrated in FIGS. 9 and 10 showing a retainer gland 40 with elements like follower gland 20 assigned like numbers. Ribs 25' of retainer gland 40 are increased in height in comparison to ribs 25 in the follower gland 20 midway between bolt holes 22, and set screw bosses 42 are provided in top web 21 to receive set screws 44 in threaded set screw holes 48 provided in bosses 42.

As may be seen in FIG. 10, the axes 46 of threaded set screw holes 48 extend radially from pipe 10 but are offset from the plane of retainer gland 40 such that tightening set screws 44 against pipe 10 places retainer gland 40 in clamping engagement with pipe 10 and urges pipe 10 toward bell end 12, thereby resisting movement of pipe 10 out of bell end 12, which may occur as a result of pressure within pipe 10 and changes, surges and thrusts of such pressure.

It is known that positioning set screws 44 at an angle offset from a perpendicular to the pipe 10 axis by approximately ten degrees (10°) results in superior retention of pipe 10 within retainer gland 40 while resisting surges and thrusts. Accordingly, set screw holes 40 are offset by substantially ten degrees (10°) in the preferred embodiment.

The described formations of the follower and retainer glands, which can be molded with precision, are for the purpose of minimizing their weight, while maximizing their rigidity and strength, particularly their resistance to bending under the forces applied by the bolts 26 and adjusting pressures. Less raw materials and energy are required in manufacturing the lightweight follower gland and retainer gland of the present invention, and less energy is required in their transportation.

It is to be understood that the form of the invention herewith shown and described is to be taken as a preferred example of the same, and that various changes in the shape, size and arrangement of parts may be restored to, without departing from the spirit of the invention or scope of the subjoined claims.

I claim:

1. A pipe joint gland for forming an effective fluid seal between interfitting bell and spigot pipe sections, comprising:

(a) a web of substantially constant thickness adapted to surround a spigot pipe section in a plane normal to the spigot pipe section axis;
(b) a generally axial wall connected to the interior margin of the web, adapted to surround the spigot pipe section and extending from one side of the web;
(c) an elastic seal annular contact face formed on the end of the wall away from the web, wherein the face;
  (i) tapers, from its outer periphery, at a shallow angle to a plane normal to the axis of the spigot pipe section, toward the web;
  (ii) is radially wider than the wall; and
  (iii) projects inwardly from the interior surface of the wall;
(d) a plurality of bosses formed circumferentially and spaced equidistantly from each other on the side of the web away from the wall, radially outward of the wall; and
(e) a plurality of bolt holes penetrating the bosses and the web, wherein each corresponds to a boss and:
  (i) is circular in shape on the end of the boss away from the wall;
  (ii) is oval in shape on the side of the web toward the wall; and
  (iii) tapers uniformly from circular to oval shape.

2. The pipe joint gland of claim 1 wherein the major axes of the oval portions of said bolt holes are circumferentially disposed on the gland.

3. The pipe joint gland of claim 1 further comprising a plurality of radial ribs located on the web, each connecting a boss to said wall.

4. The pipe joint gland of claim 3 further comprising a plurality of outer scalloped arcuate ribs located on the periphery of the web, each connecting two adjacent bosses.

5. The pipe joint gland of claim 1 further comprising a continuous interior annular rim formed on the end of the wall away from the web, the rim defining the inner margin of the elastic seal annular contact face.

6. The pipe joint gland of claim 1 further comprising a plurality of set screw bosses formed circumferentially equally spaced on the web, each set screw boss having a threaded opening axially offset from the plane of the web at an acute angle.

7. The pipe joint gland of claim 6 further comprising a plurality of set screws, each disposed in one of the threaded openings.

8. The pipe joint gland of claim 6 wherein each threaded opening is axially offset from the plane of the web at any angle of substantially ten degrees.

9. The pipe joint gland of claim 1 wherein the gland comprises ductile iron.

10. A pipe joint gland for forming an effective fluid seal between interfitting bell and spigot pipe sections, comprising:
(a) a web adapted to surround a spigot pipe section in a plane normal to the spigot pipe section axis;
(b) a generally axial wall connected to the interior margin of the web, adapted to surround the spigot pipe section and extending from one side of the web;
(c) an elastic seal annular contact face formed on the end of the wall away from the web, wherein the face:
  (i) tapers, from its outer periphery, at a shallow angle to a plane normal to the axis of the spigot pipe section, toward the web;
  (ii) is radially wider than the wall; and
  (iii) projects inwardly from the interior surface of the web;
(d) a plurality of bosses formed circumferentially and spaced equidistantly from each other on the side of the web away from the wall, radially outward of the wall;
(e) a plurality of bolt holes, each penetrating a boss and the web;
(f) a plurality of radial ribs located only on the side of the web away from the wall, each connecting a boss to the wall; and
(g) a plurality of outer scalloped arcuate ribs located only on the periphery of the web, each connecting two adjacent bosses.

11. The pipe joint gland of claim 10 wherein each of the bolt holes:
  (i) is circular in shape on the end of the boss away from the wall;
  (ii) is oval in shape on the side of the web toward the wall; and
  (iii) tapers uniformly from circular to oval shape.

12. The pipe joint gland of claim 11 wherein the major axes of the oval portions of said bolt holes are circumferentially disposed on the gland.

13. The pipe joint gland of claim 10 further comprising a continuous interior annular rim formed on the end of the wall away from the web, the rim defining the inner margin of the elastic seal annular contact face.

14. The pipe joint gland of claim 10 further comprising a plurality of set screw bosses formed circumferentially equally spaced on the web, each set screw boss having a threaded opening axially offset from the plane of the web at an acute angle.

15. The pipe joint gland of claim 14 further comprising a plurality of set screws, each disposed in one of the threaded openings.

16. The pipe joint gland of claim 14 wherein each threaded opening is axially offset from the plane of the web by an angle of substantially ten degrees.

17. The pipe joint gland of claim 10 wherein the gland comprises ductile iron.

* * * * *